United States Patent [19]

Chovanec

[11] 4,129,885
[45] Dec. 12, 1978

[54] WARM-UP COMPENSATION SYSTEM FOR PICTURE TUBE

[75] Inventor: Donald D. Chovanec, Schaumberg, Ill.

[73] Assignee: Zenith Radio Corporation, Glenview, Ill.

[21] Appl. No.: 838,695

[22] Filed: Oct. 3, 1977

[51] Int. Cl.² .............................................. H04N 3/18
[52] U.S. Cl. ................................................... 358/190
[58] Field of Search .......................... 358/190, 168, 74

[56] References Cited
U.S. PATENT DOCUMENTS

| 3,908,159 | 9/1975 | Griffey | 358/190 X |
| 3,956,669 | 5/1976 | Del Ciello | 358/190 X |

FOREIGN PATENT DOCUMENTS 2624965  2/1977  Fed. Rep. of Germany ........... 358/190

*Primary Examiner*—Richard Murray
*Assistant Examiner*—Aristotelis M. Psitos
*Attorney, Agent, or Firm*—Nicholas A. Camasto

[57] ABSTRACT

An "instant play" type device is described for quickly bringing the video display of a television receiver to normal luminance. The device develops a start-up control voltage of an initially high magnitude and a nominal control voltage of lesser magnitude for successive application to the brightness control electrode of the cathode ray tube. When the television receiver is energized, the start-up control voltage is applied to develop a normal luminance display on the cathode ray tube after which the control electrode of the cathode ray tube is automatically switched to the nominal control voltage.

10 Claims, 3 Drawing Figures

WARM-UP COMPENSATION SYSTEM FOR PICTURE TUBE

BACKGROUND OF THE INVENTION

This invention relates generally to television receivers and more particularly to an "instant play" device for enabling a television receiver to achieve a normal brightness video display shortly after being energized.

Television receivers, in general, include a cathode ray tube which reaches its full brightness capability only after an initial warm-up period during which its cathode reaches operating temperature. Such a warm-up period may extend for two to three minutes following the initial energization of the receiver.

Most receivers manufactured today employ all solid-state electronics which essentially have no warm-up time. Thus the picture tube is the only vacuum tube having a heater. This exacerbates the problem since the remainder of the receiver is functioning normally as soom as it is turned on and the video display slowly comes up to brightness.

In order to provide consumers with a more nearly "instant" picture, a number of so-called "instant play" devices or circuits have been proposed. According to one such proposal, the warm-up period for the cathode ray tube has been substantially reduced or even eliminated by providing stand-by power to maintain the cathode of the cathode ray tube at or near its normal operating temperature when the television receiver is off. When the receiver is turned on, no warm-up period is required and an "instant" picture is provided. However, the use of stand-by power is wasteful of energy, expensive and illegal in some states.

Other "instant play" proposals for reducing the time interval between the initial energization of a cathode ray tube and the time at which the cathode ray tube produces a normal brightness display have included relatively expensive circuit components or have required the existing circuitry in a television receiver to be substantially modified. In the latter case, the "instant play" device cannot be conveniently used as an add-on feature without at least some redesign of the receiver.

The shortcomings noted above in present or proposed "instant play" circuits render those circuits undesirable from the standpoint of operating efficiency or manufacturing expense.

OBJECTS OF THE INVENTION

Accordingly, it is a general object of the invention to provide an improved television receiver.

It is a more specific object of this invention to provide an instant play television receiver which requires no stand-by power for the cathode ray tube.

SUMMARY OF THE INVENTION

According to the invention, the cathode ray tube of a television receiver is quickly brought to normal brightness capability though the cathodes have not reached normal operating temperatures by an "instant play" device which includes means for generating two brightness control voltages for successive application to the brightness control electrodes of a cathode ray tube. One is a start-up bias control voltage having an initially high magnitude for controlling the initial brightness of the cathode ray tube, and the other is a nominal bias control voltage of lesser magnitude for controlling the long term brightness of the cathode ray tube. When the television receiver is first energized, the start-up control voltage is applied to the control electrodes of the cathode ray tube to bring the tube to normal brightness capability. When the cathodes are up to operating temperature, the control electrodes of the cathode ray tube are switched from the start-up control voltage to the nominal control voltage to maintain the normal brightness of the tube.

In the preferred embodiment, the start-up bias control voltage decays with time from its initial high magnitude to a magnitude below that of the nominal bias control voltage. In addition, the switching of the control electrodes from the start-up control voltage to the nominal control voltage is achieved by means which automatically couples the greater in magnitude of the two bias control voltages to the control electrodes of the cathode ray tube.

BRIEF DESCRIPTION OF THE DRAWINGS

The above and other objects of the invention are more particularly set forth in the following detailed description and in the accompanying drawings of which.

DESCRIPTION OF THE PREFERRED EMBODIMENT

Figure 1:
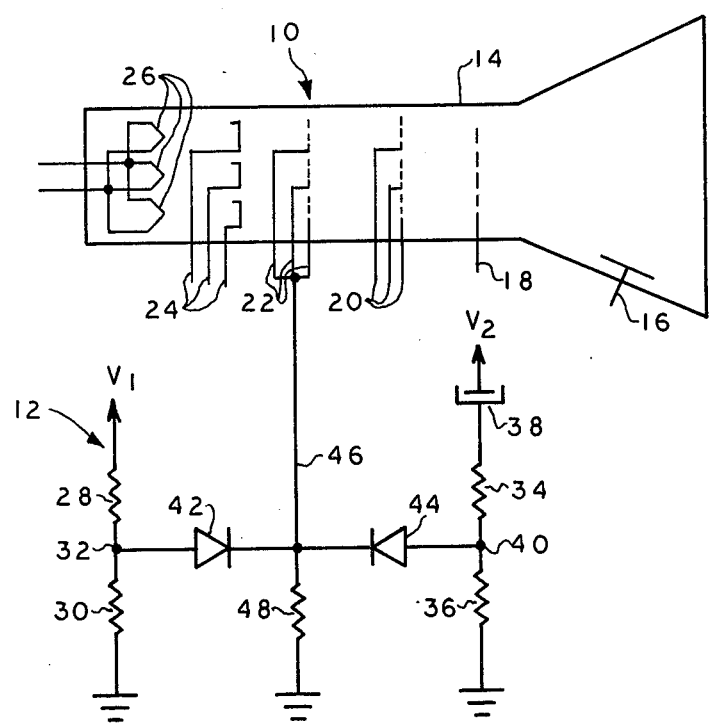
FIG. 1 is a schematic illustration of a conventional cathode ray tube and a preferred embodiment of a device for quickly driving the cathode ray tube to normal brightness levels.

Referring now to FIG. 1, there is shown a conventional, three-color cathode ray tube 10 and a network designated generally at 12 for quickly driving the cathode ray tube 10 to normal brightness. The cathode ray tube 10 includes an outer glass envelope 14 housing a number of electrodes for controlling tube operation. These electrodes, also conventional, include a high voltage anode 16, a focus electrode 18, three so-called G2 electrodes 20, three so-called G1 electrodes 22, three cathodes 24 and three heater elements 26. Typically, the G1 electrodes 22 receive a voltage for controlling the brightness of the cathode ray tube 10 and are referred to herein as the control electrodes. In other types of cathode ray tubes, other electrodes may be used to control the brightness of the tube but, for purposes of definition herein, such electrodes are also referred to as control electrodes. In addition, some cathode ray tubes may require but a single control electrode for controlling the brightness of a cathode ray tube. Accordingly, the term "control electrode" is used herein to refer to one or more electrodes which control the brightness of a cathode ray tube.

In television receivers which do not include an "instant play" device or circuit, the control electrodes are usually coupled to a conventional voltage source whose magnitude is approximately 50 volts. With the inventive structure shown in FIG. 1, network 12 develops that same conventional voltage for application to the control electrodes. In addition, network 12 generates a start-up control voltage for initially applying to the control electrodes a bias voltage which is greater in magnitude than the nominal control voltage and which is sufficient to cause the cathode ray tube to produce normal brightness levels in a relatively short period of time despite the low emission efficiency of the cathode. When proper cathode temperatures are attained, the start-up control voltage is replaced with the nominal control voltage by network 12. Connections to other of the electrodes of the cathode ray tube are conventional and not shown.

Referring more specifically to the structure of network 12, a pair of resistors 28 and 30 are serially coupled between ground and a voltage source V1 for producing at a node 32 a nominal control voltage for controlling the long term brightness of cathode ray tube 10. A start-up control voltage is generated by a voltage divider comprising resistors 34 and 36 serially coupled with a capacitor 38 between ground and a voltage source V2. The magnitude of voltage source V2 and the ratio of the values of resistors 34 and 36 are chosen such that a start-up control voltage is generated at a node 40 whose magnitude at least initially exceeds the magnitude of the nominal control voltage appearing at node 32. Preferably, the magnitude of the start-up control voltage initially exceeds the magnitude of the nominal control voltage by at least one and one-half times. Because capacitor 38 is serially coupled between node 40 and voltage source V2, the start-up control voltage appearing at node 40 will eventually decay to a level which is less than the magnitude of the nominal control voltage at node 32.

The magnitudes of the voltages appearing at nodes 32 and 40 are sensed by a pair of diodes 42 and 44 which selectively couple the nominal control voltage at node 32 and the start-up control voltage at node 40 to control electrodes 22 via lead 46. A resistor 48 is coupled between the junction of diodes 42 and 44 and ground to provide a return current path. Preferably, resistor 48 is much greater in magnitude than the other resistors in network 12 to inhibit excessive current flow through those other resistors.

By virtue of the illustrated connection to diodes 42 and 44, then apply to control electrodes 22 the larger in magnitude of either the nominal control voltage at node 32 or start-up control voltage at node 40. Because the start-up control voltage is initially greater in amplitude than the nominal control voltage, diode 44 is conductive and couples the start-up control voltage to control electrodes 22. When the start-up control voltage decays to a level below that of the nominal control voltage at node 32, diode 44 becomes non-conductive and diode 42 conducts, thereby disconnecting the start-up control voltage from control electrodes 22 and coupling the nominal control voltage. As a result of the successive applications of the start-up control voltage and the nominal control voltage, the cathode ray tube 10 is driven harder when its cathode emission is still too low for normal operations and it therefore reaches normal brightness very quickly.

The detailed operation of network 12 is best explained if it is assumed that voltages V1 and V2 are initially of zero value, corresponding to the un-energized state of a television receiver in which cathode ray tube 10 may be used. In this condition, capacitor 38 is completely discharged. When power is applied to the television receiver, V1 and V2 will rise toward their design levels and capacitor 38 will appear initially as a short circuit. Consequently, the initial current flow through resistor 34 is primarily a function of V2 and the combined resistance of resistors 34 and 36. The values of resistors 34 and 36 may be selected to cause a start-up control voltage of approximately 97 volts, for example, to initially appear at node 40.

Simultaneously, the nominal control voltage of approximately 50 appears at node 32. Diode 44 is thus rendered conductive and diode 42 non-conductive, thereby coupling the start-up control voltage at node 40 to the tube. The cathode ray tube is thus driven harder which compensates for the low emission of its cathodes which have not reached normal operating temperature. This increased drive on the cathode ray tube produces normal picture brightness very shortly after receiver energization. As capacitor 38 charges, a decreasing level of current flows from voltage source V2 through resistor 34. Thus the voltage at node 40 decreases as a function of time. When the voltage at node 40 becomes less than the voltage at node 32, diode 44 is cut off and diode 42 driven conductive, coupling the nominal control voltage via diode 42 and lead 46. Preferably, the time of switchover occurs when cathodes 24 have reached normal operating temperature. This time may be adjusted by varying the values of resistors 34 and 36 and/or capacitor 38.

In conventional television receivers, a nominal control voltage is typically generated as indicated in FIG. 1 by a pair of resistors 28 and 30 coupled between ground and a voltage source V1. By virtue of the preferred structure shown in FIG. 1, the "instant play" device illustrated therein may be merely added to the existing circuitry (resistors 28 and 30) without redesign of the existing circuitry in the receiver. Thus, only diodes 42 and 44, resistors 34, 36 and 48, and capacitor 38 need be added. The anode of diode 42 may then be coupled directly to existing node 32 which is available in the conventional television receiver.

Figure 2:
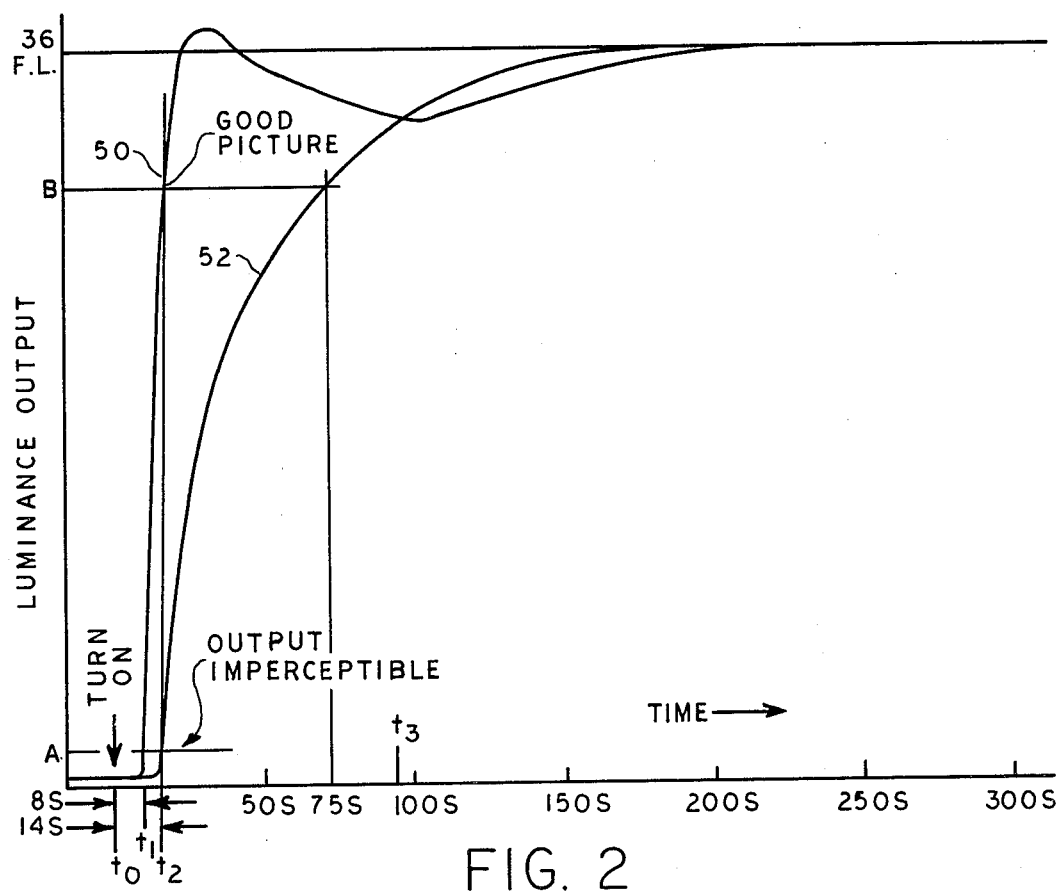
FIG. 2 illustrates two luminance output versus time curves of a conventional cathode ray tube, one curve showing the conventional luminance output and the other curve showing the luminance output as improved by this invention.

Referring now to FIG. 2, there is shown a pair of curves 50 and 52 illustrating the luminance output of a conventional cathode ray tube versus time. Curve 50 represents the response when the circuitry of network 12 is used to drive the cathode ray tube, and curve 52 represents the response without network 12 but with a nominal voltage applied to control electrodes 22. This voltage may be on the order of 50 volts. Point A on the luminance axis is where a photocell just begins to detect light output and is about the limit of perceptibility in a normally lighted room. Point B represents the luminance level for a good picture on the television screen.

Referring first to curve 50, it indicates that network 12 forces the luminance of the cathode ray tube to reach point A at time $T_1$ and point B at time $T_2$. $T_1$ occurs approximately 8 seconds and $T_2$ approximately 14 seconds after $T_0$. After reaching and somewhat exceeding the normal operating luminance output of 36 foot lamberts, the luminance of the cathode ray tube decreases as a result of the increasing charge on capacitor 38 and the resulting decrease in magnitude of the start-up control voltage. At the time indicated as $T_3$, the start-up control voltage is substantially equal to the nominal control voltage, diode 44 becomes non-conductive, diode 42 becomes conductive, and the nominal control voltage is applied to the control electrodes of the cathode ray tube. At this time, the luminance output of the cathode ray tube again rises to its long term value of 36 foot lamberts.

The negative slope of curve 50 between times $T_1$ and $T_3$ can be decreased to effect a more smooth transition at the switchover point $T_3$ by increasing the value of capacitor 38. However, it has been found that the illustrated transitional response between times $T_2$ and $T_3$ response is not objectionable to a viewer and, in fact, is not substantially noticeable.

Curve 52 illustrates the relatively long time required for the cathode ray tube to reach an acceptable luminance level when network 12 of FIG. 1 is not used. Specifically, the cathode ray tube whose response is represented by curve 52 takes 14 seconds until time $T_2$ to reach point A, the barely perceptible luminance point, and approximately 75 seconds to reach point B where a good picture is obtained. This contrasts strikingly with curve 50 which indicates 8 seconds to perceptibility and only 14 seconds to a good picture. While these curves are representative of specific type CRT's, the results attained with different tubes will be comparable.

Although network 12 of FIG. 1 preferably includes both diodes 42 and 44, diode 42 may be eliminated under certain conditions. Its function is primarily to isolate the circuitry comprising resistors 28 and 30 from the remaining portion of network 12 thus making the circuit simple to add to existing circuits and to assist in achieving a relatively long time constant (3 minutes or more), without resorting to large and costly capacitors. With diode 42 eliminated and node 32 coupled directly to lead 46, resistors 28 and 30 draw current from diode 44 and act as a shunt to resistors 34 and 36. Consequently, removal of diode 42 causes additional current to flow through capacitor 38 and resistor 34. Accordingly, the values and power handling capabilities of the various resistors would need to be adjusted to accommodate this additional current and yet provide the desired control voltages. Aside from this and the time constant problem noted above, the operation of network 12 without diode 42 is essentially as described.

Circuit component values and voltage values which have been found to be effective for bringing the cathode ray tube 10 to normal brightness in a relatively short interval are as follows:

| V1 : 250 volts | resistor 34 : 750 K ohms |
|---|---|
| V2 : 134 volts | resistor 36 : 2 meg ohms |
| resistor 28 : 390 K ohms | resistor 48 : 10 meg ohms |
| resistor 30 : 100 K ohms | capacitor 38 : 56 micro farads |

Figure 3:
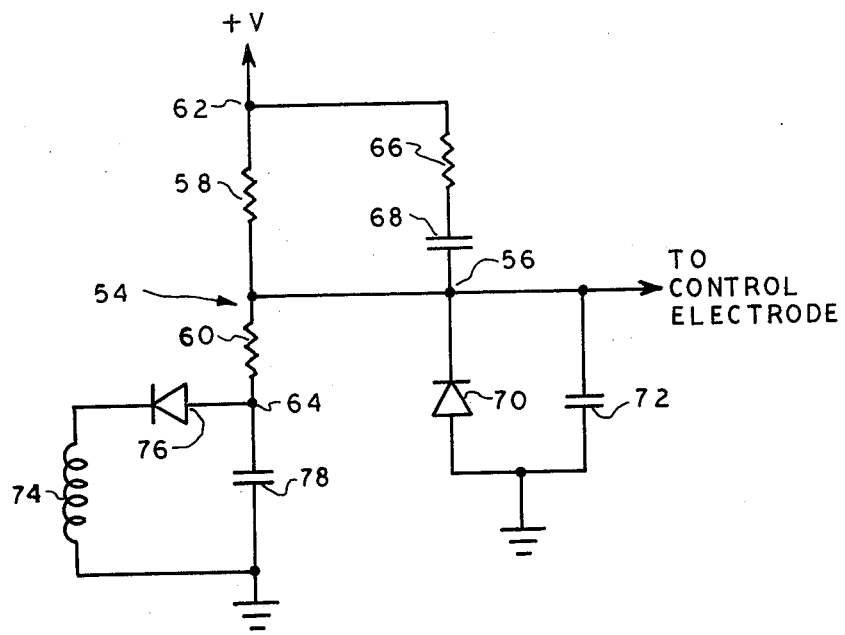
FIG. 3 illustrates an alternate embodiment of the invention.

The principles of this invention may also be used in connection with a cathode ray tube whose control electrode is normally grounded. An exemplary structure for quickly bringing such a cathode ray tube to normal brightness is shown in FIG. 3. In this illustrated embodiment, a network 54 develops a control voltage at a node 56 which is initially positive with respect to ground. The control voltage at node 56 then decays with time toward a potential which is negative with respect to ground. As the control voltage decays somewhat below ground potential, it is clamped near ground potential to maintain the control electrode at or near its normal operating value.

Referring more specifically to the components of network 54, it includes a voltage divider comprising resistors 58 and 60 having an input 62 receiving a voltage positive with respect to ground, an input 64 receiving a voltage negative with respect to ground, and an output at node 56. In parallel with resistor 58 is a resistor 66 serially coupled to a capacitor 68 for controlling the rate of decay of the control voltage at node 56. A diode 70 is coupled between ground and node 56 for clamping the control voltage at or near ground potential. To remove any AC components from the control voltage, a capacitor 72 is also coupled between ground and node 56.

The negative voltage appearing at input 64 to the voltage divider may be derived from any convenient source. As illustrated herein, this voltage is obtained from a pincushion winding 74 of the flyback transformer commonly found in television receivers. The output of winding 74 is rectified by a diode 76 and filtered by a capacitor 78. It has been found that satisfactory operation is obtained when the voltage at input 64 is approximately minus 30 volts DC and the voltage at input 62 is approximately 194 volts DC.

In operation, capacitor 68 acts as a short circuit when power is initially applied to network 54. As a result, resistor 66 is effectively in parallel with resistor 58. Hence, resistor 66 may be thought of as part of the voltage divider. The values of resistors 58, 60 and 66 are selected to sum the voltages appearing at inputs 62 and 64 such that a positive potential initially appears at node 56. Such positive potential is preferable in the range of 30 to 40 volts but may be varied to suit the characteristics of the cathode ray tube.

With a positive potential at node 56, the control electrode of the cathode ray tube receives a higher than normal drive potential, and the cathode ray tube produces normal brightness. As the cathode ray tube cathodes are reading full emission, capacitor 68 charges and reduces the flow of current through resistor 66. As a result, the voltage at node 56 decays toward a negative potential, depending on the selected values of resistors 58 and 60 and the magnitudes of the voltages at inputs 62 and 64.

When the voltage at node 56 decays sufficiently to render diode 70 conductive, the voltage at node 56 is clamped at or near ground potential, the normal operating potential of the control grid of the cathode ray tube. Thus, the control electrode initially receives a control voltage which is more positive than normal for bringing the tube to normal brightness quickly, and thereafter receives its normal operating potential.

Although the embodiments illustrated in FIGS. 1 and 3 differ in the specifics of their construction, it will be appreciated that they both employ basically the same principles. That is, the control grid of the cathode ray tube is initially coupled to a start-up control voltage whose magnitude is sufficient to bring the tube to normal brightness in a relatively short period of time.

Although the invention described herein has been illustrated in terms of a preferred embodiment, it will be obvious to one skilld in the art, that, in light of this disclosure, many alterations and modifications may be made to the described embodiments without departing from the spirit and scope of the invention. For example, diodes 42 and 44 of FIG. 1 illustrate an economical and reliable means for coupling the start-up bias control voltage and the nominal bias control voltage of the cathode ray tube. However, equivalent structure such as transistors or any other circuit elements capable of providing an equivalent function may be used in place of those diodes. Many other modifications will be obvious to those skilled in the art. Accordingly, all such alterations and modifications are intended to be included within the scope of the invention as defined by the appended claims.

What is claimed is:

1. In a television receiver having a cathode ray tube whose brightness is a function of the bias potential between a control electrode and a cathode of the cathode ray tube, a device for reducing the interval between the initial energization of the cathode ray tube and the time at which the cathode ray tube reaches full brightness capability, comprising:

means for generating a nominal bias control voltage for application to the cathode ray tube;

means for generating a start-up bias control voltage for application to the cathode ray tube, said start-up bias control voltage having at least an initial magnitude greater than the magnitude of said nominal bias control voltage; and means for automatically coupling first and start-up bias control voltage to the cathode ray tube and, after substantially full brightness capability has been achieved, decoupling the start-up bias control voltage and coupling the nominal bias control voltage thereto, whereby the cathode ray tube is quickly brought to substantially full brightness capability by the starting bias control voltage.

2. A device as set forth in claim 1 wherein said means for generating a start-up bias control voltage causes the start-up bias control voltage to decay as a function of time from an initial magnitude in excess of the magnitude of the nominal bias control voltage to a final magnitude less than the magnitude of the nominal bias control voltage, and wherein said means for coupling the control voltages to the cathode ray tube couples the greater in magnitude of the start-up bias control voltage and the nominal bias control voltage to the cathode ray tube.

3. A device as set forth in claim 2 wherein said means for generating a start-up bias control voltage includes a resistance-capacitance circuit for controlling the decay of the start-up bias control voltage.

4. A device as set forth in claim 3 wherein said means for coupling the control voltages to the cathode ray tube includes a first diode having an anode supplied to the start-up bias control voltage and a cathode supplying the cathode ray tube.

5. A device as set forth in claim 4 including a second diode having an anode receiving the nominal bias control voltage and a cathode coupled to the cathode of said first diode.

6. In a television receiver having a cathode ray tube whose brightness is a function of the bias potential between a control electrode and a cathode of the cathode ray tube, a device for reducing the time interval between the initial energization of the cathode ray tube and the time at which the cathode ray tube reaches full brightness capability, comprising:

means for generating a nominal bias control voltage of substantially constant magnitude for application to the control electrode of the cathode ray tube;

a voltage divider comprising a pair of resistors coupled in series with a voltage source and having an output terminal at the junction of said resistors, the values of said resistors being selected to generate at said output terminal a start-up bias control voltage whose magnitude exceeds the magnitude of said nominal bias control voltage;

a capacitor serially coupled between said voltage source and said voltage divider for causing the start-up bias control voltage to decay as a function of time;

a first diode having an anode coupled to the output terminal of said voltage divider and a cathode coupled to the control electrode of the cathode ray tube; and a second diode having an anode supplied with said nominal bias control voltage and a cathode coupled to the control electrode of the cathode ray tube, whereby said first diode is initially conductive and said second diode is initially non-conductive so that the control electrode of the cathode ray tube initially receives the start-up bias control voltage for quickly bringing the cathode ray tube to full brightness capability, after which the start-up bias control voltage decays to a magnitude lower than said nominal bias control voltage, said second diode becomes conductive, said first diode becomes non-conductive, and the control electrode of the cathode ray tube receives the nominal bias control voltage.

7. A device as set forth in claim 6 wherein the pair of resistors comprising said voltage divider are selected to generate an initial start-up bias control voltage which is at least one and one-half times greater than the magnitude of the nominal bias control voltage.

8. In a television receiver having a cathode ray tube whose brightness is a function of the potential between a normally grounded control electrode and a cathode of the cathode ray tube, a device for reducing the time interval between the initial energization of the cathode ray tube and the time at which the cathode ray tube reaches full brightness, comprising:

means for generating a control voltage which is initially positive with respect to ground and which decays toward a potential negative with respect to ground;

means for clamping said control voltage near ground potential when said control voltage decays to a potential negative with respect to ground; and means for coupling said control voltage to the control electrode of the cathode ray tube, whereby the control electrode of the cathode ray tube initially receives a potential positive with respect to ground for quickly bringing it to full brightness capability and thereafter receives a potential near its normal operating potential for maintaining the cathode ray tube at full brightness capability.

9. A device as set forth in claim 8 wherein said means for generating the control voltage includes a voltage divider having a first input coupled to a voltage source positive with respect to ground, a second input coupled to a voltage source negative with respect to ground, an output coupled to the control electrode of the cathode ray tube, and a resistance-capacitance network coupled between the first input and the output of said voltage divider for causing the potential at said output to decay from a potential positive with respect to ground toward a potential negative with respect to ground.

10. A device as set forth in claim 9 wherein said means for clamping said control voltage near ground potential includes a diode coupled between the output of said voltage divider and ground.

* * * * *